United States Patent Office 2,759,146
Patented Aug. 14, 1956

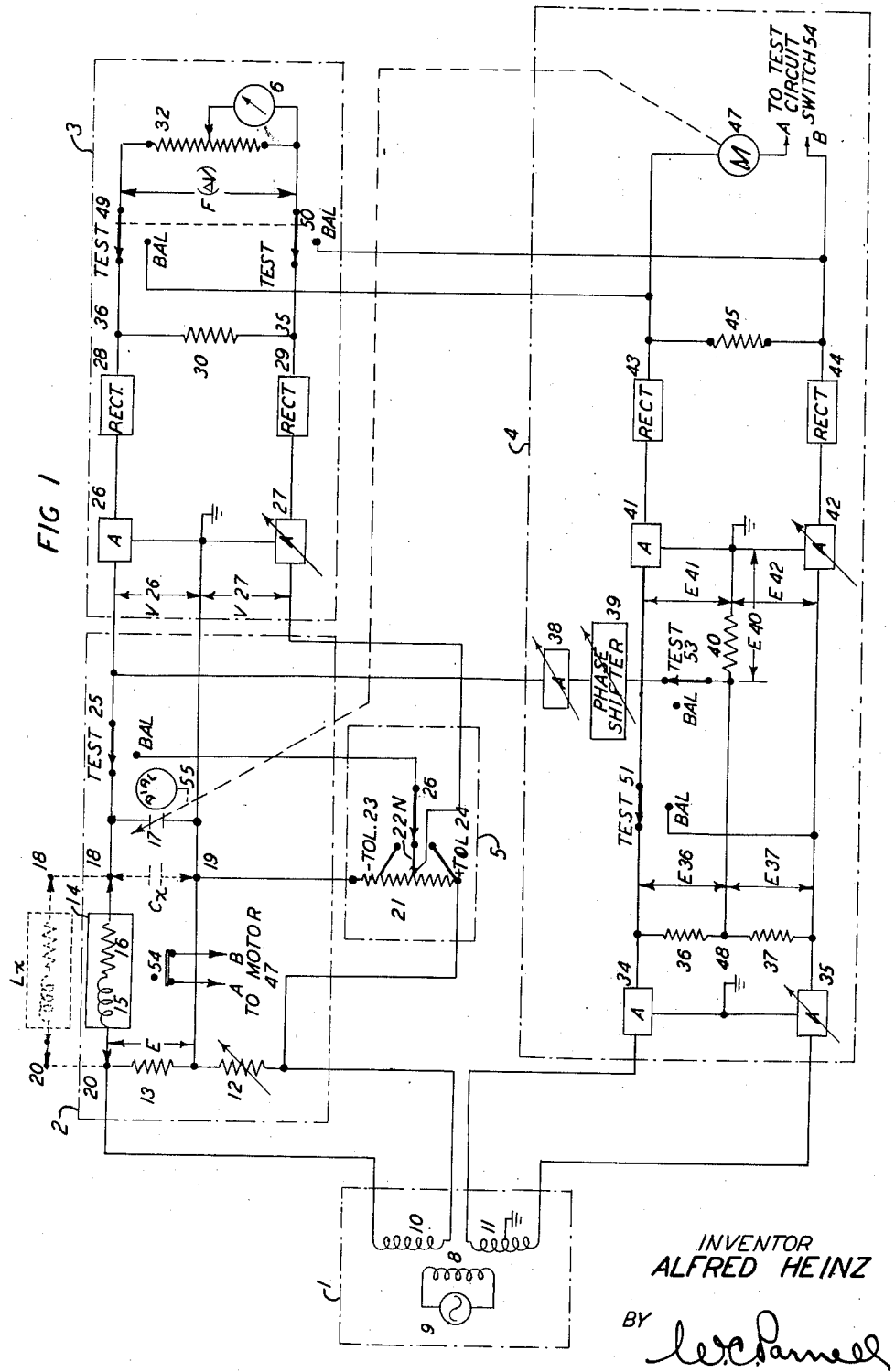
INVENTOR
ALFRED HEINZ

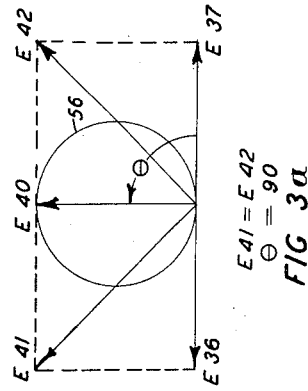
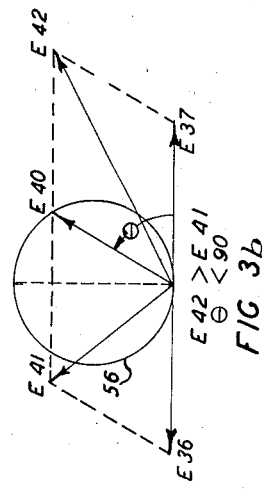
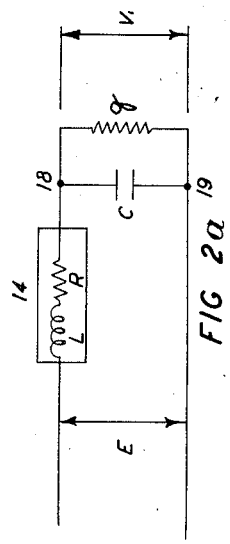
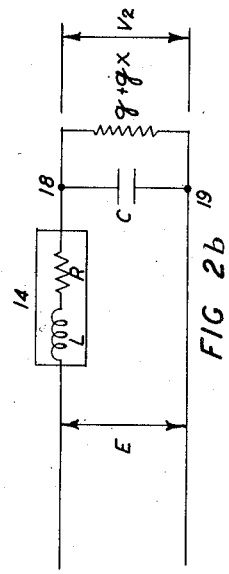
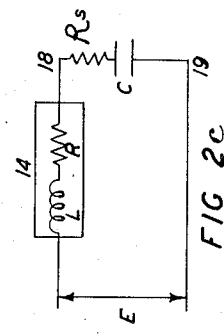
INVENTOR
ALFRED HEINZ
ATTORNEY

2,759,146

APPARATUS FOR MEASURING THE SIGNIFICANT PARAMETERS OF CONDENSERS AND COILS

Alfred Heinz, Union, N. J., assignor to Western Electric Company, Incorporated, New York, N. Y., a corporation of New York Application June 11, 1952, Serial No. 292,922

8 Claims. (Cl. 324—57)

This invention relates to electrical testing systems and particularly to a system for testing reactance elements to determine their significant parameters.

In the production testing of coils and condensers, it is desirable to have a system that simplifies testing procedure so that the testing time per unit may be substantially reduced while the degree of accuracy is maintained high. To applicant's knowledge, there are no systems or test sets presently in use that are well suited for production testing of these reactance elements. Devices such as the standard Q meter for instance, which may be used to determine certain parameters of reactance elements, demand a number of adjustments and calculations for each test.

It is the general object of this invention to provide an improved system for production testing of coils for inductance, Q deviation from a standard and of condensers for capacity, conductance and deviation of conductance from a standard.

In accordance with the invention, the potential across one element of a tuned series resonant circuit of known Q is balanced at resonance against an equal potential and means are provided for automatically retuning this circuit when it is detuned and unbalanced by the introduction into the circuit of a condenser or coil to be tested. The tuning element of the circuit is provided with scales for indicating directly the capacity of the condensers and the inductance of the coils tested, and a meter connected to measure the unbalance potential is calibrated in units of the conductance of the condensers and the Q deviation from a standard Q of the test coils. More specifically, the tunable series resonant circuit is connected to a constant-frequency source of potential. The potential across the tuning condenser of this resonant circuit is applied to one side of a first differential detector and its output is balanced by an input potential applied to its other side which is equal to the Q of the tuned circuit at resonance times its input potential. This resonant circuit becomes detuned when a unit to be tested is inserted in it, condensers being placed in parallel with the tuning condenser and coils being inserted in the place of the standard coil of the circuit. This detuned circuit is automatically retuned by the output of a second differential detector which is phase sensitive and normally balanced by an input potential from the test frequency source but unbalanced in accordance with the phase changes in the potential across the tuning condenser produced when the apparatus to be tested is connected into the circuit. Capacity or inductance is indicated directly on scales calibrated on the tuning condenser and condenser conductance, its deviation from a standard conductance or test coil Q deviation from a standard Q is indicated on a multiple scale meter in the output of the first detector.

The nature of the invention will be more fully understood from the following detailed description and by reference to the accompanying drawing in which:

Fig. 1 is a schematic diagram of an embodiment of the invention;

Figs. 2a, 2b and 2c are schematic diagrams of the series resonant circuit of the test section to be used in connection with the explanation of testing condensers;

Figs. 3a and 3b are voltage vector diagrams to be used in connection with the explanation of the phase sensitive detector circuit.

Referring to Fig. 1, the system comprises five principal sections, a test potential source 1, a test section 2, a voltage sensitive differential detector circuit with an associated meter circuit 3, an automatic resonating circuit 4 and a calibrating circuit 5. The test potential source 1 is represented as an output transformer 8 excited by a constant, single frequency voltage supply 9 which may be an oscillator circuit of conventional design and as such need not be further described herein. This fixed frequency test potential is supplied to both the test section 2 and the automatic resonating circuit 4 through secondary windings 10 and 11 respectively of transformer 8.

In the test section 2, two resistors 12 and 13, serially connected together and having the junction between them connected to ground potential, are shunted across the secondary winding 10 of transformer 8. Resistor 12 is a variable resistor which controls the magnitude of the voltage V27 supplied to one side of input to the voltage sensitive differential detector 3. Across resistor 13 is a series resonating circuit comprising a variable low loss tuning condenser 17 and a standard coil 14 having inductance 15 and resistance 16. Elements to be tested are connected into this circuit, condensers $C_x$ are connected in parallel with the tuning condenser 17, that is, between test terminals 18 and 19 and coils $L_x$ are connected to test terminals 20 and 18 in place of the standard coil 14. The voltage V26 across the tuning condenser 17, is applied to the other side of the differential detector 3. This resonating circuit is similar to the basic Q meter circuit described in detail in Patent Number 2,137,787 entitled, "Methods and Apparatus for Electrical Measurements" issued to Harold A. Snow on November 22, 1938. The resistance 13, as in the above patent to Snow, is very small in comparison with that of the resonant circuit so that there will be negligible loading effect on the voltage E across the resistor 13 due to the insertion of units for test into the circuit. The resistance 12 is adjusted so that the voltage input V27 to its side of the differential detector will be equal to the Q of the resonant circuit times the voltage E across resistor 13. Under pre-test conditions then (no test units connected into the circuit), with the resonating circuit at resonance and resistor 12 properly adjusted, V26 is equal to V27.

Buffer amplifiers 26 and 27 isolate the detector 3 from the testing circuit and also provide a degree of amplification. The outputs from the amplifiers 26 and 27 are rectified in matched, conventional rectifiers 28 and 29, the outputs of which are connected differentially to a meter circuit arranged to measure output voltage differences. Thus the voltage from rectifier 28 which is a function of V26, applied to junction 36, and the voltage from rectifier 29 which is a function of V27, applied to junction 35, will be of the same polarity so that the net voltage drop across resistor 30 is equal to the difference of potential between the two rectifier outputs and proportional to the difference in the input voltages V26 and V27. A potentiometer 32 is connected between 35 and 36, bridging resistor 30, to provide a voltage sensitivity adjustment for a zero center, direct current meter 6. The detector system is substantially independent of test voltage supply variations since a variation in the voltage to one side of the detector will be balanced by a corresponding variation to the other side. The system also can be made substantially independent of detector gain variations by, for example, using a dual type tube for the buffer amplifiers 26 and 27 and for the rectifiers 28 and 29.

Excitation voltages for the two arms of the automatic resonating circuit 4 are obtained through the secondary winding 11 of transformer 8 which as previously mentioned also excites the secondary winding 10 for the test circuit. These voltages are passed through similar buffer amplifiers 34 and 35; equal and opposite voltages E36 and E37 appear across the output matched resistors 36 and 37 which have their junction 48 connected through resistor 40 to ground. A potential E40 across resistor 40 proportional to the potential across condenser 17 of the test circuit is obtained through the connecting circuit including buffer amplifier 38 and phase shifter 39. Phase shifter 39 is adjusted so that the phase of the voltage E40, which varies with the phase of the voltage across the condenser 17, is in exact quadrature with voltages E36 and E37. The buffer amplifier 38 isolates the test circuit from the automatic resonating circuit and also provides a degree of amplification. The gain of buffer amplifier 38 is adjusted so that at resonance the magnitude of voltage E40 is approximately equal to voltage E36 or E37. Then, as resonance is approached in the tuned circuit, the sensitivity of the automatic resonating circuit is increased. By referring to the voltage vector diagrams Figs. 3a and 3b, wherein the input voltages E41 and E42 to buffer amplifiers 41 and 42 are the vector sums of E40 plus E36 and E40 plus E37 respectively, the input voltages E41 and E42 will have maximum variations for different phase angles $\theta$ when the magnitude of E40 is equal to E36 and E37. Figs. 3a and 3b also show the circular locus 56 of the voltage vector E40. The buffer amplifier 41 and 42 and the rectifiers 43 and 44 are duplicates of buffer amplifiers 26 and 27 and rectifiers 28 and 29 respectively, of the voltage sensitive detector circuit 3 previously discussed and perform identical functions except that their unbalanced output feeds a servo-mechanism type tuning motor 47 which is mechanically geared to the tuning condenser 17 of the test circuit. In Fig. 3b, phase angle $\theta$ of E40 is shown less than 90° which is the condition existing when the resonating circuit is not tuned to exact resonance as when an element to be tested is inserted in the test circuit. In this condition E42 is greater than E41 thereby causing a resultant voltage of a certain polarity to appear at the output of rectifiers 43 and 44 and across tuning motor 47 thereby causing the motor to rotate in a direction corresponding to the polarity of the output voltage. When the resonating circuit is at resonance and $\theta$ is 90° as in Fig. 3a, voltages E41 and E42 are exactly equal and motor 47 will not rotate since zero potential appears across it. On the other hand, as the resonating circuit is detuned in the opposite sense the voltage vector E41 will be greater than voltage vector E42 and the resulting polarity of the voltage across the tuning motor 47 will cause it to rotate in the opposite direction. In either case, whenever phase angle $\theta$ is other than 90° the differential voltage will drive the motor 47 and thus the tuning condenser 17 in a direction, depending on the polarity of the motor voltage, so as to decrease the degree of detuning. The motor stops when resonance is reached since its driving voltage is zero. Conventional servo damping means may be employed to prevent the servomotor 47 from hunting or oscillating about the resonant condition.

The motor circuit is provided with a switch 54, located on a jig on which the terminal posts 18, 19 and 20 of the test section 2 are mounted. The switch is normally in the open position however, when a unit to be tested is connected to its proper terminal posts, the unit makes physical contact with the actuating member of the switch, thereby energizing the motor circuit.

Now that the principal circuits of the invention have been generally discussed, the preliminary adjustments of the system will be described. To balance the two arms of the voltage sensitive detector circuit 3, switch 25 is set to the balance position thereby placing the same potential across the inputs to buffer amplifiers 26 and 27. Buffer amplifier 27 which contains a gain adjustment is adjusted to give a zero deflection on meter 6.

In balancing the automatic resonating circuit 4, since the voltages across resistors 36 and 37, E36 and E37 respectively must be equal, it is first necessary to balance the circuits directly following these resistors. To do this, ganged switches 49 and 50, together with switch 51, are thrown to the balance position. When in the balance position, switches 49 and 50 disconnect the meter 6 and its associated potentiometer 32 from the outputs of rectifiers 28 and 29 and connect them to the outputs of rectifiers 43 and 44; switch 51 in the balance position places the inputs of buffer amplifiers 41 and 42 at the same potential so that by changing the gain adjustment of buffer amplifier 42 to give a zero deflection on meter 6, the two arms of the detector of the resonating circuit from the buffer amplifiers 41 and 42 are balanced. Test switch 51 is then returned to its test position and test switch 53 is thrown to the balance position thereby removing any unbalance to the automatic resonating circuit 4 due to the output from the phase shifter 39. The voltages E36 and E37 are next balanced by varying the adjustment of buffer amplifier 35 until a zero deflection is observed on meter 6.

Finally the buffer amplifier 38 and phase shifter 39 must be adjusted. A simple method of doing this is, first set the resonating circuit to resonance, at this condition the voltage across resistor 40, in the inputs to buffer amplifiers 41 and 42, must be adjusted to be in phase quadrature with voltages E36 and E37 in order that the driving voltage of the tuning motor 47 be zero. Since at resonance the voltage across the condenser 17 will be maximum, a vacuum-tube voltmeter is placed across the condenser and the condenser is automatically tuned by varying phase shifter 39 until a maximum voltage is indicated on the meter. To adjust buffer amplifier 38 a vacuum-tube voltmeter is used to measure the voltage E36 and E37, and the voltage E40 across resistor 40 is adjusted to be substantially equal to E36 or E37 by varying the gain adjustment of buffer amplifier 38.

Before coils or condensers may be tested, a preliminary adjustment of resistor 12 must be made with the resonating circuit, comprising the standard coil 14 and tuning condenser 17, at resonance. The tuned condition is obtained automatically by motor 47 driving the tuning condenser 17 to resonance, the voltage input to buffer amplifier 26, V26 or the voltage across the tuning condenser is very closely $$V26 = Q_s E \qquad (1)$$

where $Q_s$ is the Q of the standard coil 14 and E is the voltage across resistor 13. Resistor 12 is then adjusted to give a zero deflection on meter 6. At this setting, the voltage input to buffer amplifier 27, V27 is equal to V26 or $$V27 = V26 = Q_s E \qquad (2)$$

In testing coils for inductance, coil Q deviation from a standard Q, the standard coil 14 is replaced with a coil $L_x$ to be tested and the test circuit 2 is automatically resonated by motor 47 retuning condenser 17. The differential voltage input to the detector 3 then becomes $$\Delta V = V27 - V26 = Q_s E - Q_x E = (Q_s - Q_x) E \qquad (3)$$

or $$\Delta V = \Delta Q E \qquad (4)$$

where the subscript $x$ denotes the test unit. In other words the indication of meter 6, being a function of $\Delta V$, is directly proportional to the Q variation of the test unit from that of the standard coil. Inductance of the test unit may be read on a scale calibrated to the setting of the tuning condenser 17, since the inductance of the circuit is related to the capacity at resonance by the equation $$\omega L = \frac{1}{\omega C}$$

Since $\omega$ is a constant, the variable condenser 17 is calibrated to indicate inductance directly.

The principle of operation of the invention in testing condensers for capacity and conductance may be understood by referring to Figs. 1, 2a, 2b and 2c.

In Fig. 2a, showing the tuned circuit portion of Fig. 1, the conductance of the condenser 17 is shown as $g$ and its capacity plus the distributed capacity is represented as C. The condenser 17 may be provided with a scale calibrated in terms of C so that in using the system the distributed capacity may be disregarded. The inductance and resistance of the standard coil 14 are represented as L and R respectively, the voltage input as E and the voltage across the condenser, V1. Fig. 2b shows the different tuned circuit which results when a condenser to be tested is added in shunt with condenser 17. In resonating the tuning condenser 17, C is the same as in Fig. 2a but the conductance across the equivalent capacity is now $g$ plus $g_x$, the conductance of the test unit. The voltage in this case across the condenser is V2. The voltages V1 and V2 correspond to voltages V26 and V27 respectively, as shown in Fig. 1. The purpose of the following explanation is to show the relationship between differential voltage $\Delta V$ and $g_x$, the conductance of the unit under test.

The conductance of a condenser is $$g = \frac{1}{R_p}$$

where $R_p$ is equal to the equivalent resistance shunting the condenser. The shunting resistance $R_p$ is related to corresponding equivalent resistance $R_s$ in series with the condenser as shown in Fig. 2c, by the relationship $$R_p = (1 + Q_c^2) R_s$$

where $Q_c$ is the Q of the condenser. Since $Q_c$ is generally much larger than 100, this expression for practical purposes, reduces to $$R_p = Q_c^2 R_s \qquad (5)$$

then $$g = \frac{1}{R_p} = \frac{1}{Q_c^2 R_s} \qquad (6)$$

since by definition $$Q_c = \frac{\omega C}{g}, R_s$$

from Equation 6 may be defined as $$R_s = \frac{g}{(\omega C)^2} \qquad (7)$$

Since at resonance $\frac{1}{\omega C} = \omega L$ Equation 7 becomes $$R_s = (\omega L)^2 g \qquad (8)$$

Equations for V1 and V2 will now be developed so that an expression for $\Delta V$ may be obtained.

$$V_1 = QE \qquad (9)$$

where Q is the Q of the circuit, this may be written as $$V_1 = \frac{\omega L E}{R + R_s} = \frac{\omega L E}{R + (\omega L)^2 g} \qquad (10)$$

and $$V_2 = \frac{\omega L E}{R + (\omega L)^2 (g + g_x)} \qquad (11)$$

The difference $\overline{\Delta V}$ becomes: (the bars denoting absolute magnitude)

$$\overline{\Delta V} = \overline{V_1} - \overline{V_2} = \omega L E \left( \frac{1}{R + (\omega L)^2 g} - \frac{1}{R + (\omega L)^2 (g + g_x)} \right)$$

which reduces to $$\overline{\Delta V} = \frac{Q_1^2 g_x \omega L E}{(1 + Q_1^2 R g)(1 + Q_1^2 R g + Q_1^2 R g_x)} \qquad (12)$$

In the case of a working system according to the invention, a low loss air dielectric tuning condenser 17 having a $g$ of $\omega \times 0.04 \times 10^{-12}$, a standard coil with a $Q_1$ of 100, $\omega L$ of 2500 and a frequency of operation of 20 kilocycles, the term $$(Q_1^2 R g)$$

appearing in the denominator of Equation 12 twice was found to equal 0.00125 so that the Equation 12 reduces, with a negligible error, to $$\overline{\Delta V} = \frac{Q_1^2 \omega L E g_x}{1 + Q_1 \omega L g_x} \qquad (13)$$

with an error $Q_1 \omega L g \times 10^{-7}\%$ where $g$ is given in milli-micromhos. In the case where the above components and frequency are used $\overline{\Delta V}$ becomes $$\overline{\Delta V} = \frac{100 E g_x}{4 + g_x} \qquad (14)$$

Since the $g_x$ term will be extremely small (i. e., between 20 and 200 milli-micromhos for mica), as compared to the other term of the denominator, the expression reduces to $$\Delta V = 25 E g_x \qquad (15)$$

with an error of $0.025 g_x \%$.

From Equation 15 it is observed that $\Delta V$ is equal to a constant times $g_x$, the meter 6 of Fig. 1 is therefore calibrated to read $g_x$ directly on a second scale. The capacity of a test unit is indicated directly on a second scale calibrated on the tuning condenser; such a calibrated scale may be provided since the capacity of the unit under test is equal to the difference of capacity of condenser 17 at the standard condition of resonance with no test unit inserted and the capacity of condenser 17 with the test unit inserted and the circuit at resonance.

The testing of condensers after initial line up of the circuit is carried out as follows: a test condenser is inserted in the circuit, micro-switch 54 in the testing jig closes the motor circuit. The motor tunes the circuit automatically and $g_x$ is indicated directly on meter 6. The capacity of the test unit is read directly from the tunable condenser dial. The test condenser is then removed and the micro-switch opens the motor switch.

The system as described may be used to compare the coil Q or condenser conductance of test elements with the Q or conductance of standard units of the type to be tested. Indications of plus and minus limiting tolerances may be obtained on meter 6 by using the potentiometer circuit 5 of Fig. 1. By changing V26 by a prescribed amount from a standard condition, $\Delta V$ will be changed by the same amount and the meter indication will be directly proportional to the variation. The potentiometer 5 which is bridged across resistor 12, has a reference or "N" tap 22 which is connected to the input to buffer amplifier 27, providing an input potential V27 which is less than the full potential across the potentiometer. Taps 23 and 24 are provided on the potentiometer for applying certain percentages of V27 to the input to buffer amplifier 26 when switch 25 is thrown to the balance position and the switch 26 is thrown to +Tolerance position 24 or —Tolerance position 23. While only two tolerance taps are shown in the drawing, as many taps as desired, depending on the different tolerances specified for various elements to be tested, may be provided. For instance, certain elements may have tolerances of plus and minus 5% and others 10%, taps on the potentiometer for 105% and 95% as well as 110% and 90% of V27 would therefore be required. In utilizing this system for comparing the Q or conductance of test units with standards and their tolerance limits, by adjusting resistor 12, reference voltage V27 is made equal to the voltage across condenser 17 when a standard unit of the type to be tested has been inserted and the circuit tuned to resonance thereby balancing meter 6 at zero. Switch 25 is then thrown to the balance position and switch 26 is thrown first to the +Tolerance position 24 to get a meter indication of the plus tolerance limit then to the —Tolerance position 23 for a meter indication of the minus tolerance limit. The meter 6 may be provided with movable markers which may be set to the tolerance deflections indicated. Switch 25 is then returned to its test position, units to be tested are inserted in the test circuit, the test circuit is automatically tuned and, if the resulting meter indication is between the established tolerance markers, the unit meets the test requirements.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In apparatus for measuring the significant parameters of reactance elements, a source of constant frequency test potential, a tunable series resonating circuit including a condenser and a coil connected to the source, means for obtaining from the source a second potential equal to the series circuit Q times the potential applied to the circuit, terminals in the circuit for connecting in the reactance elements to be tested, a normally balanced detector, means for applying the potential across one of the elements of the series circuit and said second potential to the inputs of the detector, means for deriving from the detector an output varying with the potential across said one of the elements when an element to be measured is connected to the terminals, means for retuning the circuit to resonance with an element to be tested connected therein, a reactance indicator actuated by the retuning means and means for obtaining an indication proportional to the difference between the potential across said one of the elements of the retuned circuit and the second potential for obtaining another parameter of a reactance element under test.

2. In apparatus for measuring the capacity and conductance of condensers, a source of constant frequency test potential, a tunable series resonating circuit of known Q including a coil standard and a tunable condenser connected to the source, means for obtaining from the source a second potential which is Q times the potential applied to the circuit, terminals connected to the two sides of the condenser for connecting in condensers to be tested, a normally balanced detector, means for applying the potential across one of the elements of the series circuit and said second potential to the inputs of the detector, means for deriving from the detector an output varying with the potential across said one of the elements when an element to be measured is connected to the terminals, means responsive to the phase of the variable input to the detector for retuning the circuit to resonance with an element to be tested connected therein, a capacitance indicator actuated by the retuning means and means for obtaining an indication proportional to the difference between the potential across said one of the elements of the resonant circuit and the second potential for indicating the conductance of the element.

3. In a system for testing condensers, a source of constant frequency test potential, a first differential detector, a tunable circuit comprising an inductance in series with a condenser in shunt to the input to one side of the first detector, means for applying a potential from the source to the other side of the first detector input to balance the detector output when the circuit is tuned to resonance, a second normally balanced differential detector energized from the source, circuit connections for applying to the common branch in the inputs of the second detector, a potential varying in phase with the phase of the potential across the condenser, terminals for connecting condensers to be tested in parallel with the condenser in the tunable circuit, means actuated by unbalance potentials in the output of the second detector for retuning the circuit, a capacity indicator actuated by the retuning means and a meter in the output of the first detector for measuring conductance.

4. In apparatus for measuring the significant parameters of reactive elements, a source of test frequency potential, a tunable series resonating circuit including a standard coil and a tunable condenser connected to the source, said tunable condenser having means for indicating inductance and capacity of elements to be tested, the series circuit being provided with terminal posts to which elements to be tested are connected, means for automatically resonating the series circuit, means for obtaining from the source a potential which is equal to the series circuit Q times its input voltage and applying it to one of the inputs to the differential detector, the potential across one of the reactance elements of the series resonant circuit being applied to the other input, a meter in the output of the differential detector for indicating conductance of condensers and the Q deviation of coils from the Q of the standard coil, and normally open contacts closed by an element to be tested in test position for energizing the automatic resonating means.

5. In a system for comparing the conductance of condensers with a standard conductance, a source of constant frequency test potential, a first differential detector, a tunable circuit comprising an inductance in series with a condenser in shunt to the input to one side of the first detector, means for applying a potential from the source to the other side of the first detector input to balance the detector output when the circuit is tuned to resonance with the conductance of the condenser equal to that prescribed for the condensers to be tested, a secondary normally balanced differential detector energized from the source, circuit connections for applying to the common branch in the inputs of the second detector a potential varying in phase with the phase of the potential across the condenser, terminals for connecting condensers to be tested in parallel with the condenser in the tunable circuit, means actuated by unbalance potentials in the output of the second detector for retuning the circuit, a capacity indicator actuated by the retuning means and a meter in the output of the first detector for measuring conductance deviations from the prescribed conductance and switching means for disconnecting the condenser input from said one side of the first detector and connecting thereto, predetermined percentages of the potential input to the said other side of the detector to fix tolerance limit indications on the said meter.

6. In a system for comparing the Q of coils to be tested with the Q of a standard coil, a source of constant frequency test potential, a first differential detector, a tunable circuit comprising a standard coil of known Q in series with a condenser in shunt to the input to one side of the first detector, means for applying a potential from the source to the other side of the first detector input to balance the detector output when the circuit is tuned to resonance, a second normally balanced differential detector energized from the source, circuit connections for applying to the common branch in the inputs of the second detector a potential varying in phase with the phase of the potential across the condenser, terminals for connecting coils to be tested in place of the standard coil, means actuated by unbalance potentials in the output of the second detector for retuning the circuit, an inductance indicator actuated by the retuning means and a meter in the output of the first detector for measuring the Q deviation of the test coils from the said known Q and switching means for disconnecting the condenser input from said one side of the first detector and connecting thereto, predetermined percentages of the potential input to the said other side of the detector to fix tolerance limit indications on the said meter.

7. In apparatus for measuring the capacitance and conductance of condensers, a source of constant frequency test potential, a tunable series resonating circuit including a condenser and a coil of known Q connected to the source, means for obtaining from the source a second potential equal to the series circuit Q times the potential applied to the circuit, terminals in the circuit for connecting in the condensers to be tested, a normally balanced detector, means for applying the potential across one of the elements of the series circuit and said second potential to the inputs of the detector, means for deriving from the detector an output varying with the potential across said one of the elements when a condenser to be measured is connected to the terminals, means for retuning the circuit to resonance with an element to be tested connected therein, a capacitance indicator actuated by the retuning means and means for obtaining an indication proportional to the difference between the potential across said one of the elements of the retuned circuit and the second potential and for obtaining the conductance of a condenser under test.

8. In apparatus for measuring the inductance and deviation of Q from a known Q of coils, a source of constant frequency test potential, a tunable series resonating circuit including a condenser and a coil of known Q connected to the source, means for obtaining from the source a second potential equal to the series circuit Q times the potential applied to the circuit, terminals for connecting coils to be tested in place of the coil of known Q, a normally balanced detector, means for applying the potential across one of the elements of the series circuit and said second potential to the inputs of the detector, means for deriving from the detector an output varying with the potential across said one of the elements when a coil to be measured is connected to the terminals in place of the coil of known Q, means for retuning the circuit to resonance with an element to be tested connected therein, an inductance indicator actuated by the retuning means and means for obtaining an indication proportional to the difference between the potential across said one of the elements of the retuned circuit and the second potential for obtaining the deviation of Q from that of the coil of known Q.

References Cited in the file of this patent
UNITED STATES PATENTS

| | | |
|---|---|---|
| 2,137,787 | Snow | Nov. 22, 1938 |
| 2,200,863 | Schuck | May 14, 1940 |
| 2,320,175 | Dennis et al. | May 25, 1943 |
| 2,519,668 | Konigsberg | Aug. 22, 1950 |
| 2,547,650 | McCool | Apr. 3, 1951 |